United States Patent
Pop et al.

(10) Patent No.: US 8,160,197 B2
(45) Date of Patent: Apr. 17, 2012

(54) NUCLEAR POWER PLANT USING NANOPARTICIES IN CLOSED CIRCUITS OF EMERGENCY SYSTEMS AND RELATED METHOD

(75) Inventors: Mihai G. M. Pop, Lynchburg, VA (US); Brian Glenn Lockamon, Evington, VA (US)

(73) Assignee: Areva NP, Paris la Défense (FR)

( * ) Notice: Subject to any disclaimer, the term of this patent is extended or adjusted under 35 U.S.C. 154(b) by 122 days.

(21) Appl. No.: 11/714,423

(22) Filed: Mar. 6, 2007

(65) Prior Publication Data

US 2008/0219396 A1    Sep. 11, 2008

(51) Int. Cl.
*G21C 9/00* (2006.01)
(52) U.S. Cl. .................. 376/282; 376/298; 376/277
(58) Field of Classification Search .................. 376/282, 376/298, 299, 277, 305, 306
See application file for complete search history.

(56) References Cited

U.S. PATENT DOCUMENTS

| | | | | |
|---|---|---|---|---|
| 3,047,479 | A * | 7/1962 | Young et al. | 376/366 |
| 3,929,567 | A * | 12/1975 | Schabert et al. | 376/282 |
| 3,984,282 | A * | 10/1976 | Kleimola | 376/282 |
| 4,057,034 | A * | 11/1977 | Farquhar et al. | 376/316 |
| 4,587,080 | A * | 5/1986 | Johnson | 376/282 |
| 4,694,693 | A | 9/1987 | Gerlowski | |
| 5,006,303 | A * | 4/1991 | Rowlands | 376/282 |
| 5,049,353 | A * | 9/1991 | Conway et al. | 376/293 |
| 5,268,943 | A * | 12/1993 | Corletti et al. | 376/282 |
| 5,271,051 | A * | 12/1993 | Corletti et al. | 376/298 |
| 5,375,151 | A * | 12/1994 | Gluntz et al. | 376/310 |
| 6,724,854 | B1 * | 4/2004 | Kim et al. | 376/306 |
| 6,793,883 | B2 * | 9/2004 | Andresen et al. | 422/7 |
| 7,995,701 | B2 * | 8/2011 | Liu et al. | 376/364 |

FOREIGN PATENT DOCUMENTS

WO    WO 2008/005590 A    1/2008

OTHER PUBLICATIONS

US Nuclear Regulatory Commission, 10 CFR Part 50 Appendix A, Jan. 1994.*
D'Arrigo, Am J Physiol Sep. 1978 235(3)—Abstract only.*
Webster's Collegiate Dictionary, tenth edition, p. 591, 1998.*
J. Buongiorno, L. Hu, S. Kim, R. Hannick, B. Truong, E. Forrest, "Use of Nanofluids for Enhanced Economics and Safety of Nuclear Reactors," COE-INES International Symposium, INES-2, Yokohoma, Japan, Nov. 26-30, 2006.
S. J. Kim, I. C. Bang, J. Buongiomo and L. W. Hu: "Effects of Nanoparticle Deposition on Surface Wettability Influencing Boiling Heat Transfer in Nanofluids," Appl. Phys. Lett., vol. 89, p. 153107-1-153107-3, Oct. 2006 (3 pages).
I. C. Bang et al., "Boiling Heat Transfer Performance and Phenomena of $Al_2O_3$-Water Nanofluids from a Plain Surface in a Pool," Int'l J. of Heat and Mass Transfer vol. 48, No. 12, Jun. 1, 2005, pp. 2407 to 2419.

(Continued)

*Primary Examiner* — Ricardo Palabrica
(74) *Attorney, Agent, or Firm* — Davidson, Davidson & Kappel, LLC

(57) ABSTRACT

A nuclear power plant with an improved cooling system using nanoparticles in solid or fluid form to improve heat transfer and reduce corrosion is provided. The nanoparticles are delivered to a closed cooling circuit such as a CCWS. Methods for providing the nanoparticles are also provided.

18 Claims, 2 Drawing Sheets

OTHER PUBLICATIONS

J. Buongiorno and L. Hu, "Nanofluid Coolants for Advanced Nuclear Power Plants," proceedings of ICAPP May 15-19, 2005, vol. 6, No. 5705, Apr. 2007.

S.J. Kim, B. Troung, J. Buongiorno, L.W. Hu, and I.C. Bang, "Surface Wettability Change During Pool Boiling of Nanofluids and its Effect on Critical Heat Flux", Int'l. J. of Heat and Mass Transfer, Jan. 22, 2007, (12 pages).

R. Hannick J. Buongiorno, L. Hu and G. Apostolakis, "Enhancement of the In-Vessel Retention Capabilities of Advanced Light Water Reactors Tthrough the Use of Nanofluids," proceedings of ICAPP May 13-18, 2007, No. 7106.

R. Hannink, J. Buongiorno, L. Hu and G. Apostolakis, "Using Nanofluids to Enhance the Capability of In-Vessel Retention of FuelFollowing Severe Reactor Accidents," Canes Publications, Advanced Nuclear Power Program, No. MIT-ANP-TR-116, Jun. 2007.

R. Hannink, J. Buongiorno, and L.W. Hu "In-Vessel Retention Enhancement through the Use of Nanofluids" Transactions of the ANS, ANS, La Grange Park, Illinois, vol. 95, Jan. 1, 2006, pp. 691-692.

J. Buongiorno and L. Hu, "Nanofluids for Enhanced Economics and Safety of Nuclear Reactors," Nov. 29, 2007, pp. 1-25.

R. Hannink, J. Buongiorno, L.W. Hu : "In-Vessel Retention Enhancement through the Use of Nanofluide" ANS Winter Congress Proceedings, Albuquerque, New Mexico, Nov. 12-16, 2006; (2 pages).

H. E. Patel, S. K. Das, T. Sundararajan, A. S. Nair, B. George, and T. Pradeep, "Thermal conductivities of naked and monolayer protected metal nanoparticle based nanofluids: Manifestation of anomalous enhancement and chemical effects," Appl. Phys. Lett., vol. 83, p. 2931-2933, Oct. 6, 2003 (3 pages).

* cited by examiner

NUCLEAR POWER PLANT USING NANOPARTICIES IN CLOSED CIRCUITS OF EMERGENCY SYSTEMS AND RELATED METHOD

BACKGROUND

The present invention relates general to nuclear power plants, and more specifically to the emergency systems of such power plants.

A nuclear power plant typically has a nuclear reactor and a reactor coolant system (RCS) for removing heat from the reactor and to generate power. The two most common types of reactors, boiling water reactors (BWRs) and pressurized water reactors (PWRs) are water-based. In a PWR, the heated water from the reactor is fed to an electricity generator having a secondary coolant stream boiling a coolant to power a turbine. In a BWR, the electricity generator has a turbine driven directly by the reactor coolant. The RCS section downstream of the electricity generators but upstream of the reactor typically is called the cold leg, and downstream of the reactor and upstream of the electricity generators is typically called the hot leg.

If a failure occurs in the RCS, in what is typically called a loss of coolant accident (LOCA), the nuclear core does not properly cool, temperature begins to rise in the reactor. The temperature of the fuel elements in the core rises and, if not checked, can cause melt and potentially void the reactor, releasing the melt into the containment building. LOCA accidents of both PWRs and BWRS may include a main steam line break (MSLB).

During a LOCA, a standard evolution of pressure and temperature inside the containment involves an increase in pressure to a few bars in 5-18 hours, with a maximum temperature around 150° C., which is reduced to atmospheric pressure and temperature in a few days. Nuclear power plants are designed to weather such an event with a considerable safety margin. The cooling process is based on the physical properties of water and air at those temperatures.

During a LOCA in a PWR, an emergency core cooling system (ECCS) can be activated to cool the reactor by providing additional water to the RCS. An ECCS typically thus includes a high-pressure pump such as a centrifugal charging pump/high pressure injection pump (CCP/HPIP pump) exiting into the RCS. This can pump water from the refueling water storage tank (RWST), such as an in-containment RWST (IRWST), or a containment sump into the cold leg of the RCS. A volume control tank receiving water passing through a heat exchanger from the RCS cold leg can also provide water to the CCP/HPIP pump. A similar ECCS typically is present in BWRs where volumes of water existing in stand-by are actively or passively passed through the core in case of a LOCA accident.

The ECCS also typically has a low-pressure pump, such as a residual heat removal or safety injection system pump (RHR/SIS pump), which can provide water from the RWST or containment sump to the PWR or BWR reactor vessel, as well as water to a containment spray system. A heat exchanger is typically provided after the RHR/SIS pump, and heated water coming form reactor is passed through the heat exchanger, which transmits heat to a safety injection Closed Cooling Water System (CCWS). The CCWS transmits heat collected by the ECCS to an ultimate heat sink such as a river, cooling towers or the sea under post-LOCA or post-MSLB long-term cooling conditions.

The article entitled "In-Vessel Retention Enhancement through the Use of Nanofluids" describes using nanofluids for In-Vessel retention enhancement during an accident scenario. The conceptual nanofluid injection system includes two small tanks of concentrated nanofluid, with each tank capable of supplying enough nanofluid to provide enhancement predicted by a computational model. The injection is considered to occur upon the manual actuation of valves connected to injections lines. Instructions to actuate these valves are required to be placed in the severe accident procedures. The injection is said to be driven by gravity and overpressure provided by accumulators attached to the tanks. The injection lines are such that they can terminate in the reactor cavity, in the recirculation lines, or in the IRWST, depending on the physical space limitations within containment.

U.S. Pat. No. 6,724,854 describes the use of catalytic nanoparticles to high-temperature water systems to reduce stress corrosion cracking.

SUMMARY OF THE INVENTION

One object of the present invention is to increase the heat transfer from nuclear reactor and to evacuate the heat from the containment building under accident conditions in an effective manner.

The present invention provides a nuclear power plant comprising a reactor; a reactor coolant system and a closed cooling circuit independent of the reactor coolant system, the closed cooling circuit including nanoparticles in coolant in the closed cooling circuit or including a nanoparticle supply inlet.

The present invention also provides a method for improving accident heat removal capacity in a nuclear power plant comprising:

providing nanoparticles, or a nanoparticle supply capable of delivering nanoparticles, to a closed cooling circuit independent of a primary reactor coolant.

The present invention also provides a method for improving corrosion of water-phase closed cooling systems of a nuclear power plant comprising:

providing nanoparticles, or a nanoparticle supply capable of delivering nanoparticles, to a closed cooling circuit independent of a primary reactor coolant.

BRIEF DESCRIPTION OF THE DRAWINGS

One preferred embodiment of the present invention will be described with respect to the drawing in which.

DETAILED DESCRIPTION OF THE PREFERRED EMBODIMENT

Figure 1:
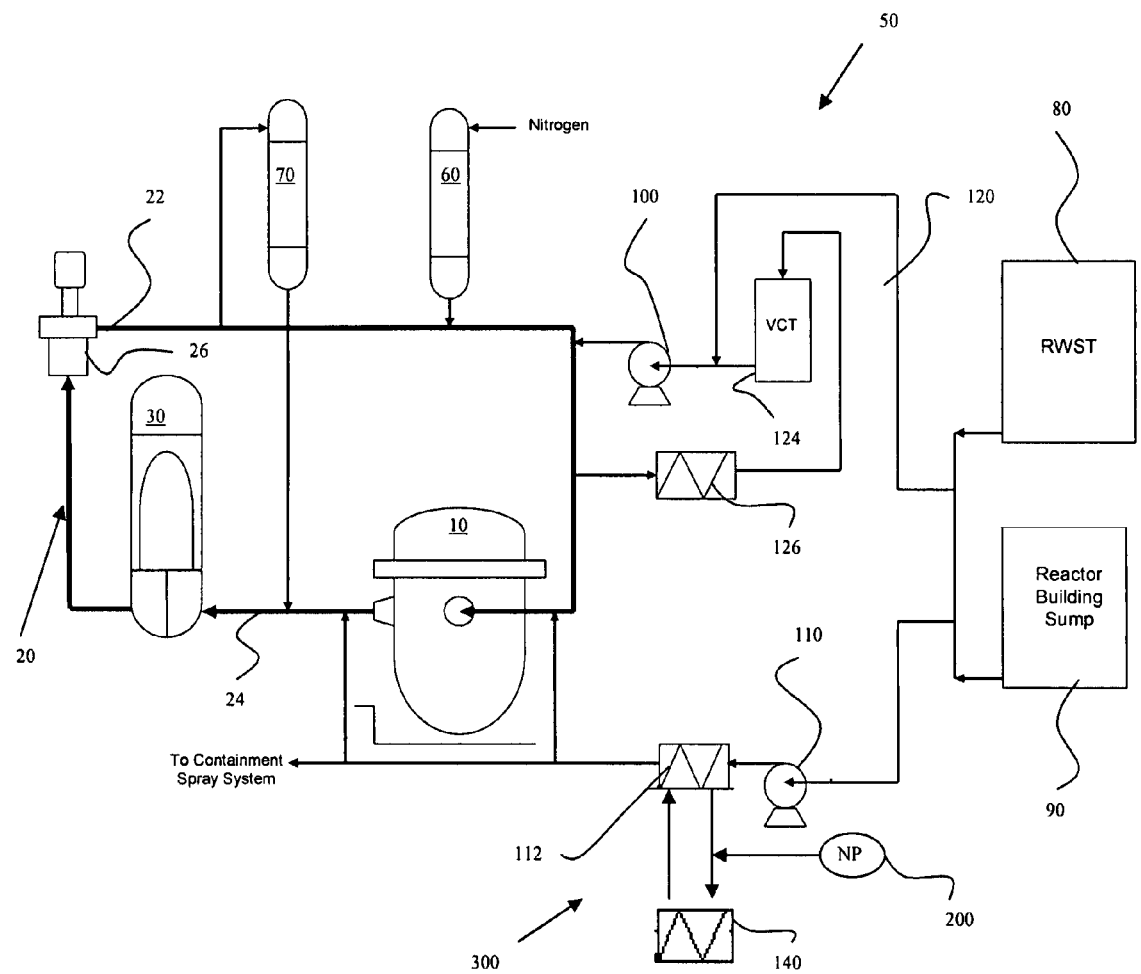
FIG. 1 shows schematically a PWR nuclear power plant with an emergency cooling system according to the present invention.

FIG. 1 shows a PWR nuclear power plant having a reactor 10, a reactor coolant system 20, and an electricity generator 30. In the PWR embodiment shown, electricity generator 30 includes a secondary coolant stream and a turbine. The reactor coolant system 20 includes a cold leg 22 between generator 30 and reactor 10, and a hot leg 24 between reactor 10 and generator 30, as well as a coolant pump 26 in cold leg 22. The reactor coolant system 20 for the PWR embodiment shown also may contains one or more pressurizers 70. In a BWR embodiment, pressurizers 70 typically are not present and generator 30 includes a turbine without having a secondary coolant stream and RCS 20 includes a condenser.

RCS 20 recirculates water during normal operation, and in the preferred embodiment no nanoparticles are added intentionally to the RCS during normal operation, as these can cause issues with the generator and other components.

The nuclear power plant further includes an emergency core cooling system, indicated generally as 50, which includes one or more accumulators or core flooding tanks 60, a refueling water storage tank 80, a containment sump 90, a high pressure pump 100, and a low pressure pump 110.

RWST 80 is connected to the pump 100, which may be a centrifugal charging pump/high pressure injection pump, via a line 120. Pump 100 may also be connected to a volume control tank 124, which can receive water from cold leg 22 via a letdown heat exchanger 126. Pump 100 can provide water from RWST 80 or the containment sump 90 into the RCS 20 during a LOCA accident. Containment sump 90 thus provides water which collects in the containment during a severe accident, for example after RWST 80 has emptied.

Low pressure pump 110, which may be a residual heat removal/safety injection system pump, provides water from RWST 80 or containment sump 90 to a heat exchanger 112, and also to the hot leg 24, cold leg 22 and a containment spray system. A CCWS 300 passes coolant such as water between a heat exchanger 112 and a heat exchanger 140, which can be connected to an essential service water system such as a river, cooling tank or the sea.

The present embodiment provides for a nanoparticle supply 200 which can provide concentrated nanofluid or nanoparticles into the CCWS 300. Such an application increases cooling capacity in the CCWS 300 for example after a LOCA accident, and also during normal operation. The nanoparticles also can be used to mitigate corrosion.

Figure 2:
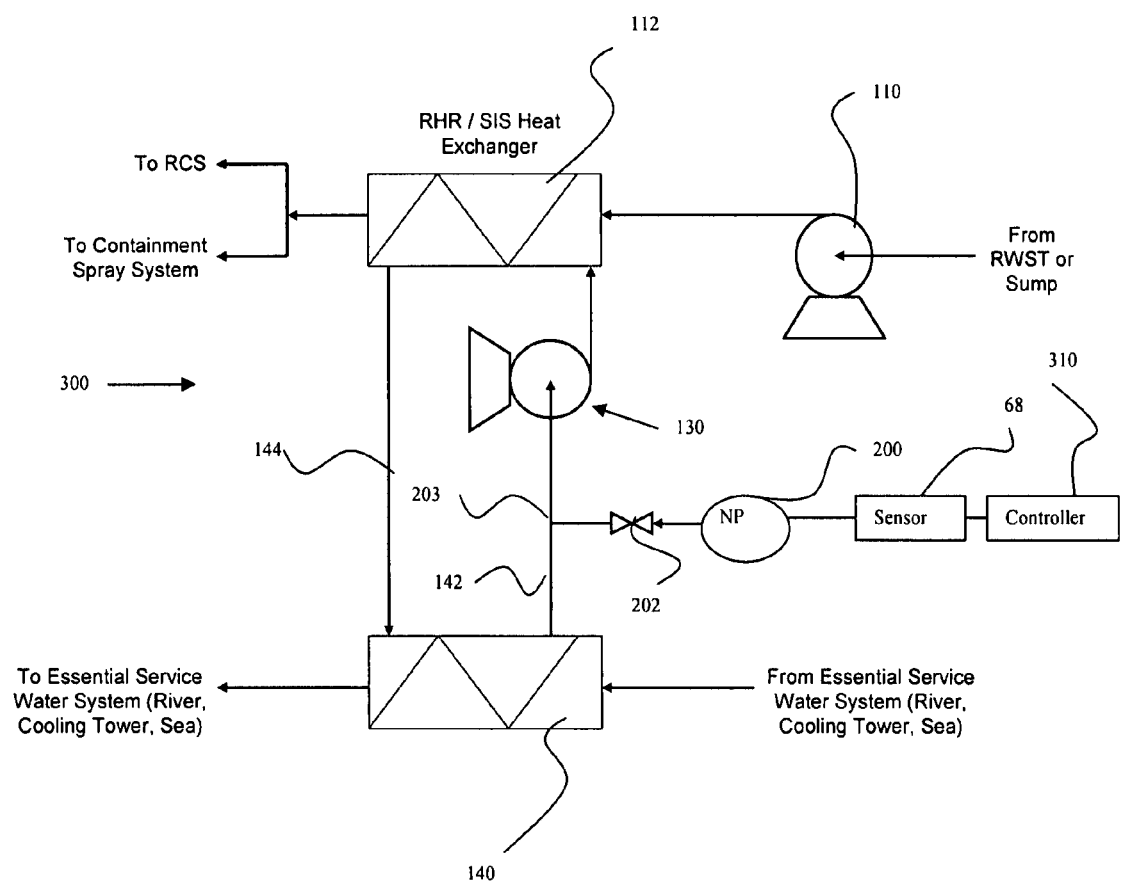
FIG. 2 shows the details of the CCWS of FIG. 1 in more detail.

FIG. 2 shows the CCWS 300, which can be used in a PWR or BWR, and nanoparticle supply 200 in more detail. A motor actuated valve 202, called the fill valve, has an outlet into a line 142. A pump 130 can recirculate the coolant in the CCWS circuit, which includes line 142 and a second line 144 between heat exchangers 112 and 140.

Nanofluid in concentrated form is supplied via a tank or series of tanks, and reaches the line 142 through the inlet of the valve 202.

Motor-driven valve 202 can release the concentrated nanofluid into the larger fluid volume of the CCWS circuit via a nanoparticle supply inlet 203. In one embodiment, diluted nanofluid can reside in the circuit for a long period of time. The properties and stability of the nanofluid can be checked in accordance with the plant emergency system testing procedures, and if necessary the motor valve 202 can be actuated to permit more concentrated nanofluid or nanoparticles in the tanks as needed to maintain the desired concentration in the CCWS circuit. A fill source can provide water to the tanks or CCWS 300, for example to increase the water concentration if the nanoparticle concentration in the circuit becomes too large. Such an action can be accompanied first by draining some of the water/nanoparticle solution through a drain valve in the CCWS.

In another embodiment, the source nanomaterial can remain in the tanks and be applied to water in CCWS 300 via nanoparticle supply inlet 203 only after accident conditions occur.

The nanofluid material tank may include a number of tanks with total volume and maneuverability obtained considering the volume and characteristics of the closed circuit. The tanks can be a combination of dry nanopowder silos injecting nanopowder to the outlet or concentrated nanofluid tanks injecting the liquids into the outlet. The concentrated nanofluid tanks can have a system of feed and bleed that allow addition of nanofluids or nanomaterials to the tanks at given intervals to maintain the quality of the nanofluid suspension. A sensor 68 can sense the nanoparticle level, and a controller 310 can actuate the drain valves and fill valves (or any other valves) to provide a desired concentration in supply 200. If the desired concentration in supply 200 and the volume of fluid in CCSW 300 are known, the concentration of nanoparticles in CCSW 300 can be controlled. Alternate to sensors, an operator can enter in a determined nanoparticle concentration and desired concentration and the controller can correct the concentration based on the known amounts of the volumes in the tanks. In addition, the entire quality of the nanofluid in the tanks may be maintained manually. The controller can be used to control the valves and nanoparticle delivery throughout the course of an accident event, such as a severe accident, and during normal operation, for example from a control room.

If the concentrated nanofluids are not located in the CCWS 300 during normal operation, the injection can proceed into the CCWS 300 after accident conditions occur.

Rather than nanofluids, nanoparticle supply 200 can provide solid nanopowder to be injected with the help of an inert gas flow provided from a flask with the gas pressure. The gas containing the particles in the fluid stream is discharged into the CCWS 300.

The nanoparticles are of sub-micron size, preferably in the 10 to 300 nanometer size. The nanoparticles preferably are non-abrasive, non-reactive and stable under severe accident conditions in view of radiation field, temperature and pressure considerations. The nanomaterials may include, but are not limited to, $ZrO_2$, C(diamond), $Al_2O_3$, $SiO_2$, $Fe_3O_4$, Cu, and CuO.

The delivery of the nanoparticles can be designed to maintain a concentration of less than 0.5 percent per volume in the CCWS circuit coolant. The setpoint concentration can be achieved by performing regular checks, or through sensors and a controller as described above. For example, the CCWS water may be maintained with a concentration of approximately 0.001 percent (or injected prior to release to achieve this concentration). The heat transfer properties of CCWS 300 can be increased significantly as a result. As opposed to nanoparticles delivered at high temperatures, the present nanoparticles can be stable and non-catalytic, and deliver corrosion resistance by providing a more uniform coating than that delivered at high-temperatures. The temperature for delivery advantageously can be less than 100 degrees Celcius.

With the present invention the closed cooling circuit may include nanoparticles in coolant in the closed cooling circuit. This can occur for example when the closed cooling circuit is first constructed or via addition of nanoparticles at a later date. Alternately or additionally, the closed cooling circuit may have a nanoparticle supply inlet. If such a nanoparticle supply inlet is present, the nanoparticles can be supplied to the closed cooling circuit during normal operation, for example to maintain a desired concentration, or can be supplied only when needed during emergency conditions.

What is claimed is:

1. A nuclear power plant comprising:
   a reactor;
   a reactor coolant system circulating fluid to cool the reactor, the reactor coolant system including a hot leg upstream of the reactor and a cold leg downstream of the reactor;
   a closed cooling circuit including a coolant including nanoparticles, the closed cooling circuit cooling at least one of the hot leg and the cold leg of the reactor coolant system via a heat exchanger in such a manner that the nanoparticles of the closed cooling circuit do not enter the fluid circulated in the reactor coolant system and the closed cooling circuit cools the reactor coolant system at least one of before the fluid enters the reactor or after the fluid exits the reactor.

2. The nuclear power plant as recited in claim 1 further comprising an emergency cooling system, the closed cooling circuit being part of the emergency cooling system.

3. The nuclear power plant as recited in claim 1 further comprising a nanoparticle supply inlet for providing nanoparticles to the coolant.

4. The nuclear power plant as recited in claim 1 wherein the closed cooling circuit is a closed cooling water system.

5. The nuclear power plant as recited in claim 2 wherein the closed cooling circuit includes at least a second heat exchanger, one of the heat exchanger and the second heater being on a hot side of the closed cooling circuit and one of the heat exchanger and the second heat exchanger being on a cold side of the closed circuit, and a pump connected to the heat exchangers.

6. The nuclear power plant as recited in claim 5 further comprising an essential service water system, the heat exchangers capable of transferring heat from the closed cooling circuit to the essential service water system.

7. The nuclear power as recited in claim 1 further comprising a nanoparticle supply inlet and a nanoparticle supply connected to the nanoparticle supply inlet.

8. The nuclear power plant as recited in claim 7 further comprising a controller controlling the nanoparticle supply to provide a setpoint concentration of nanoparticles in the coolant of the closed cooling circuit.

9. The nuclear power plant as recited in claim 3 further comprising a nanoparticle supply, the nanoparticle supply having a fill valve connected to the nanoparticle supply inlet.

10. The nuclear power plant as recited in claim 2 wherein the closed cooling circuit cools the reactor coolant system by removing heat from the emergency cooling system.

11. The nuclear power plant as recited in claim 5 wherein the nanoparticles flow between the at least two heat exchangers.

12. The nuclear power plant as recited in claim 1 wherein the closed cooling circuit increases cooling capacity during normal operation of the reactor.

13. The nuclear power plant recited in claim 1 further comprising a spray containment system, the closed cooling circuit cooling fluid entering the spray containment system in such a manner that the nanoparticles of the closed cooling circuit do not enter the fluid entering the spray containment system.

14. A nuclear power plant comprising:
a reactor;
a reactor coolant system circulating fluid to cool the reactor;
a line supplying additional fluid into the reactor coolant system during an accident;
a closed cooling circuit including a coolant including nanoparticles, the closed cooling circuit cooling the reactor coolant system by cooling the line in such a manner that the nanoparticles of the closed cooling circuit do not enter the fluid circulated in the reactor coolant system.

15. The nuclear power plant recited in claim 14 further comprising at least one of a refueling water storage tank and a containment sump, the at least one of the refueling water storage tank and the containment sump supplying the additional fluid to the line.

16. A nuclear power plant comprising:
a reactor;
a reactor coolant system circulating fluid to cool the reactor;
a refueling water storage tank for providing water during an accident;
a closed cooling circuit including a coolant including nanoparticles, the closed cooling circuit cooling the reactor coolant system via a heat exchanger in such a manner that the nanoparticles of the closed cooling circuit do not enter the fluid circulated in the reactor coolant system or water from the refueling water storage tank.

17. The nuclear power plant recited in claim 16 further comprising a spray containment system receiving the water from the refueling water storage tank during an accident, the closed cooling circuit cooling fluid entering the spray containment system in such a manner that the nanoparticles of the closed cooling circuit do not enter the water entering the spray containment system.

18. The nuclear power plant recited in claim 16 further comprising a pump providing water from the refueling water storage tank to the heat exchanger and into the reactor coolant system.

\* \* \* \* \*